United States Patent
Ikehashi et al.

(10) Patent No.: US 8,604,725 B2
(45) Date of Patent: Dec. 10, 2013

(54) SEMICONDUCTOR DEVICE AND DRIVE METHOD OF ELECTROSTATIC ACTUATOR

(71) Applicants: Tamio Ikehashi, Yokohama (JP); Takayuki Miyazaki, Tokyo (JP); Hiroyuki Hara, Fujisawa (JP)

(72) Inventors: Tamio Ikehashi, Yokohama (JP); Takayuki Miyazaki, Tokyo (JP); Hiroyuki Hara, Fujisawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 13/719,924

(22) Filed: Dec. 19, 2012

(65) Prior Publication Data

US 2013/0106318 A1 May 2, 2013

Related U.S. Application Data

(63) Continuation of application No. PCT/JP2011/069969, filed on Aug. 26, 2011.

(30) Foreign Application Priority Data

Aug. 30, 2010 (JP) ................................ 2010-192599

(51) Int. Cl.
*H01L 41/04* (2006.01)
(52) U.S. Cl.
USPC ............. 318/116; 200/181; 324/457; 324/686
(58) Field of Classification Search
USPC .......... 318/116; 438/50, 52, 379, 619, 56, 57; 257/414, 532, 534, 415, 417, 312; 331/117, 177, 36, 16, 34, 100; 361/278, 281, 283.2, 283.4, 782, 793, 361/799, 207; 73/514.32; 200/181; 324/457, 686
See application file for complete search history.

(56) References Cited

U.S. PATENT DOCUMENTS

| | | | | |
|---|---|---|---|---|
| 6,362,018 B1 * | 3/2002 | Xu et al. | ........................ | 438/50 |
| 6,441,449 B1 * | 8/2002 | Xu et al. | ....................... | 257/414 |
| 6,750,659 B2 * | 6/2004 | Murphy | ....................... | 324/686 |
| 7,402,249 B2 * | 7/2008 | Ikeda | ........................... | 210/647 |
| 7,751,173 B2 * | 7/2010 | Ikehashi et al. | ................ | 361/271 |
| 7,786,820 B2 * | 8/2010 | Hunt et al. | .................. | 333/24 C |
| 7,834,681 B2 * | 11/2010 | Suzuki | ......................... | 327/536 |
| 7,885,051 B2 * | 2/2011 | Ikehashi et al. | ................ | 361/271 |
| 7,894,205 B2 * | 2/2011 | Lee et al. | ....................... | 361/782 |
| 8,035,949 B2 * | 10/2011 | Miyano | ......................... | 361/271 |
| 8,076,912 B2 * | 12/2011 | Suzuki | ......................... | 323/242 |
| 8,129,802 B2 * | 3/2012 | Fukuda et al. | ................ | 257/415 |
| 8,174,306 B2 * | 5/2012 | Ikehashi | ........................ | 327/536 |
| 2007/0181411 A1 * | 8/2007 | Ikehashi et al. | ................ | 200/181 |
| 2009/0066299 A1 | 3/2009 | Suzuki | | |

(Continued)

OTHER PUBLICATIONS

International Search Report for PCT/JP2011/069969 mailed Feb. 21, 2012.

*Primary Examiner* — Rita Leykin
(74) *Attorney, Agent, or Firm* — White & Case LLP

(57) ABSTRACT

According to one embodiment, a semiconductor device includes an electrostatic actuator including first and second lower electrodes, an upper electrode, and an insulating film provided between the upper electrode and the first and second lower electrodes, the first lower electrode and upper electrode configuring a first variable capacitance element, the second lower electrode and upper electrode configuring a second variable capacitance element, a first fixed capacitance element connected to the first lower electrode, a second fixed capacitance element connected to the second lower electrode, and a detection circuit connected to the upper electrode and configured to detect a charge amount stored in the insulating film.

23 Claims, 11 Drawing Sheets

(56) References Cited

U.S. PATENT DOCUMENTS

| | | |
|---|---|---|
| 2009/0072630 A1 | 3/2009 | Miyazaki |
| 2010/0127764 A1 | 5/2010 | Suzuki |
| 2011/0063773 A1 | 3/2011 | Ikehashi et al. |
| 2011/0063774 A1 | 3/2011 | Ikehashi et al. |
| 2011/0234043 A1* | 9/2011 | Despesse ............... 310/300 |

* cited by examiner

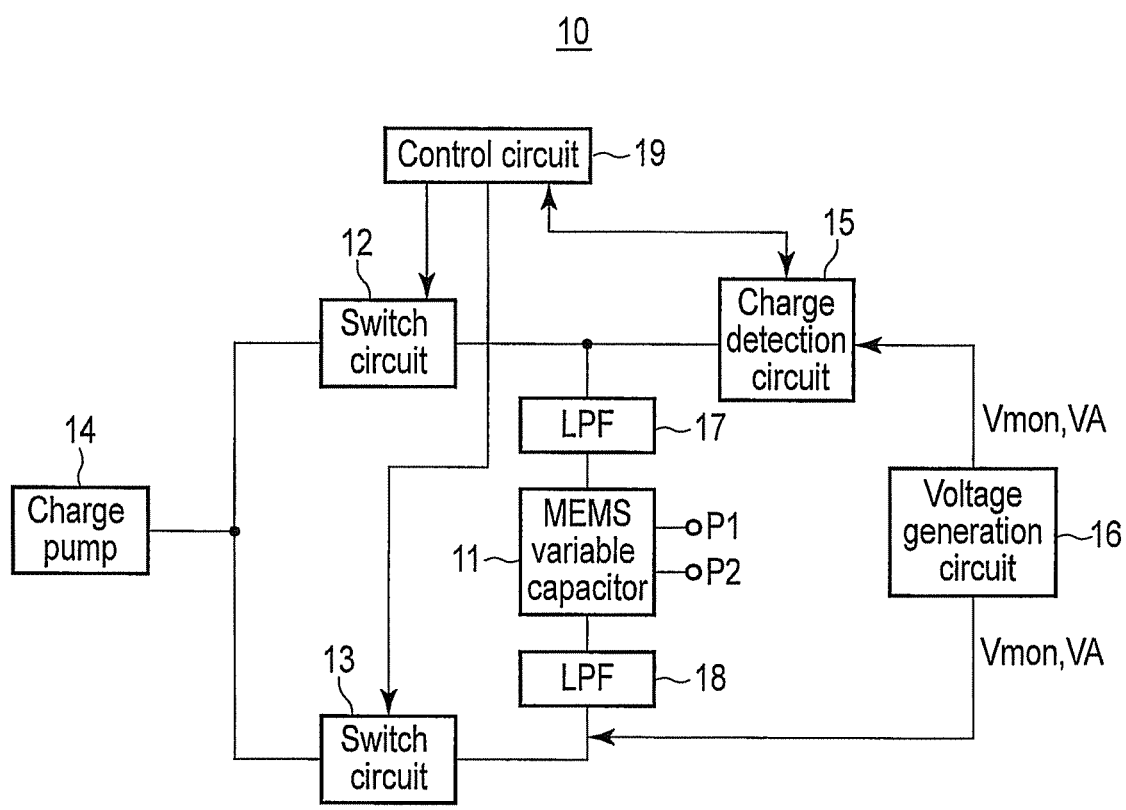
F I G. 1

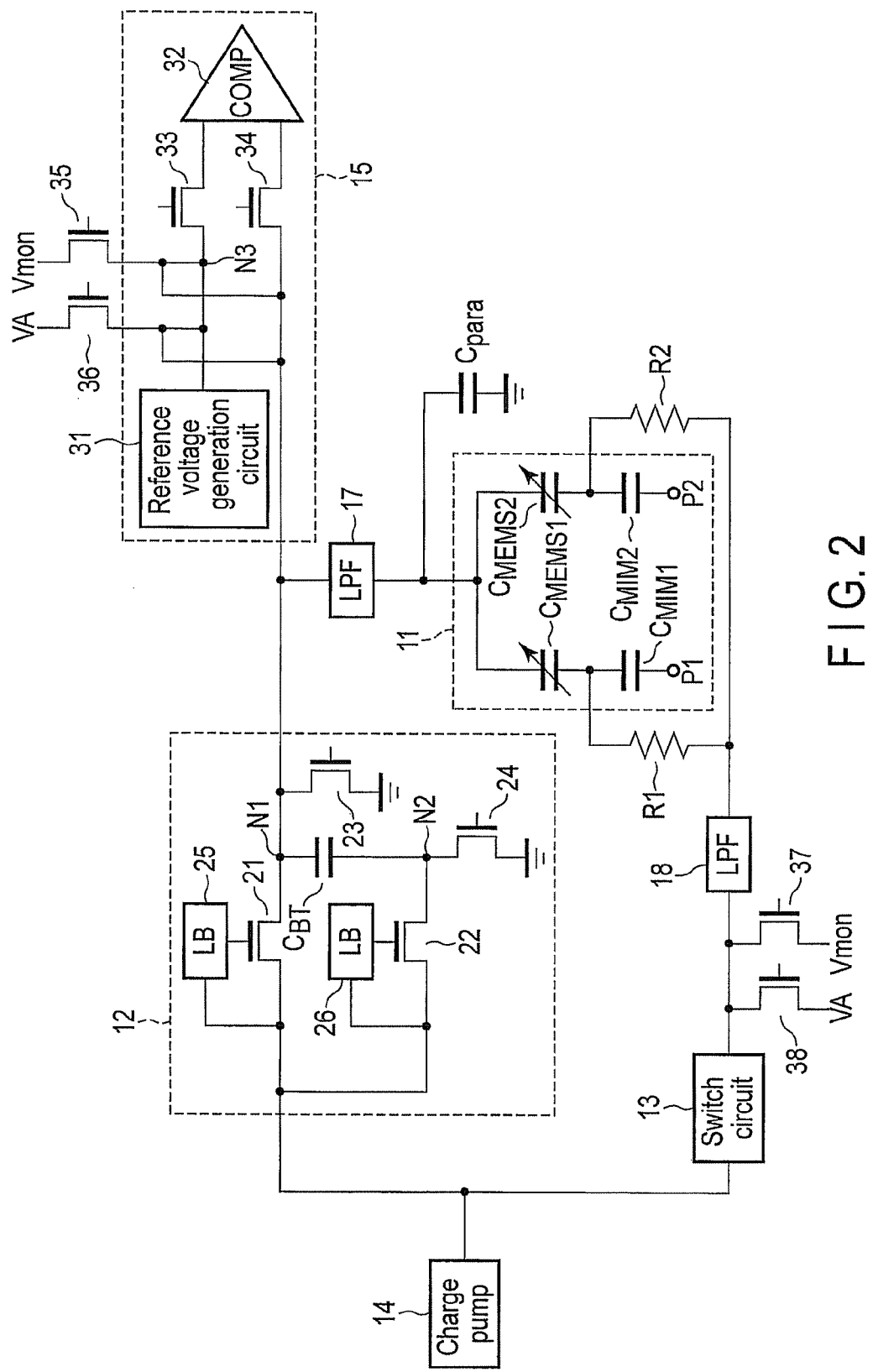
F I G. 2

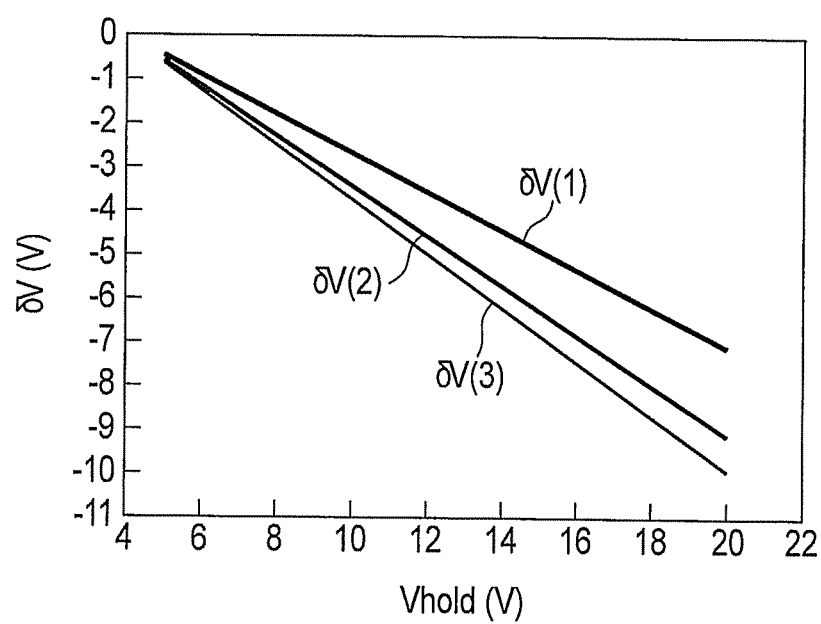
F I G. 12

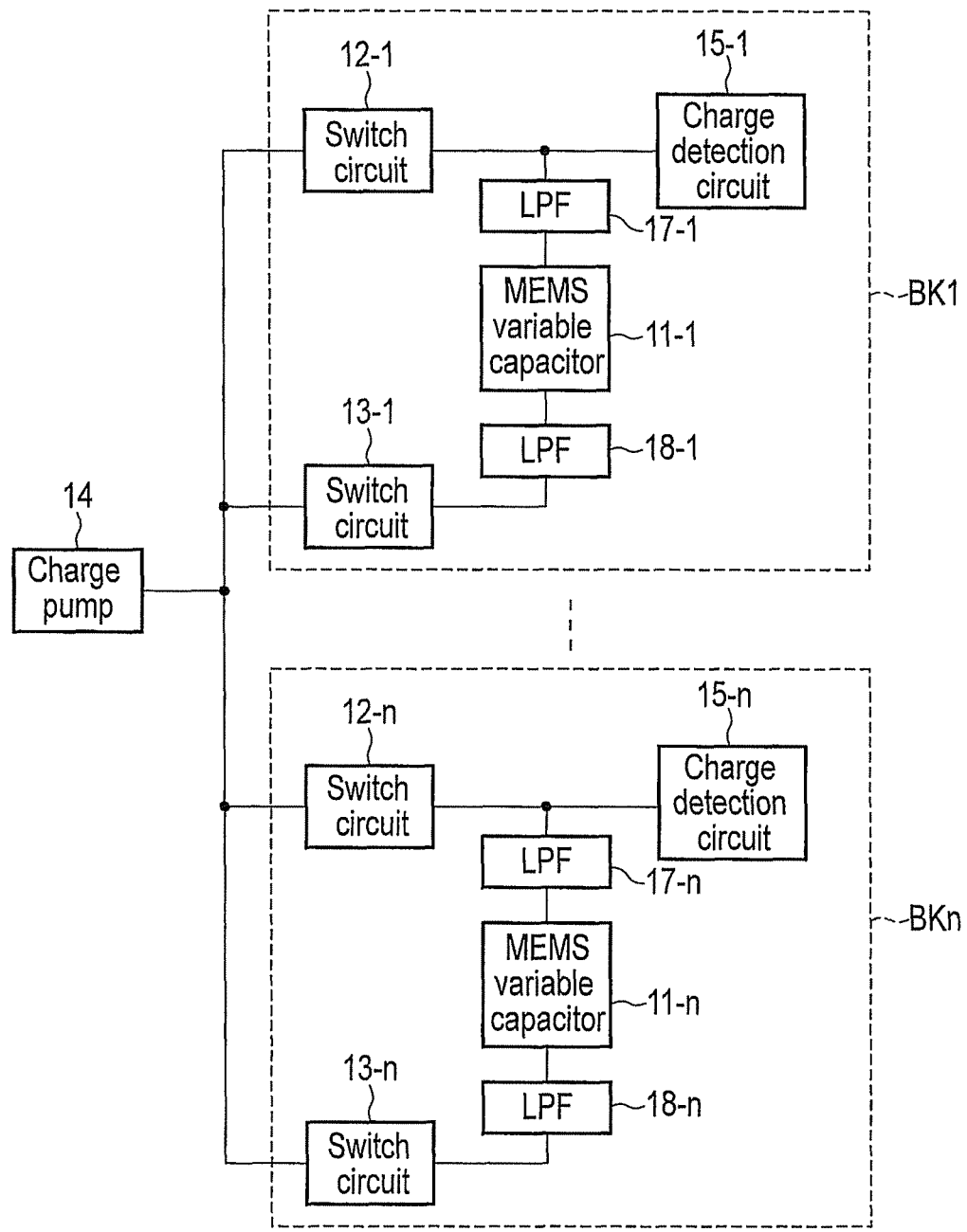
F I G. 13

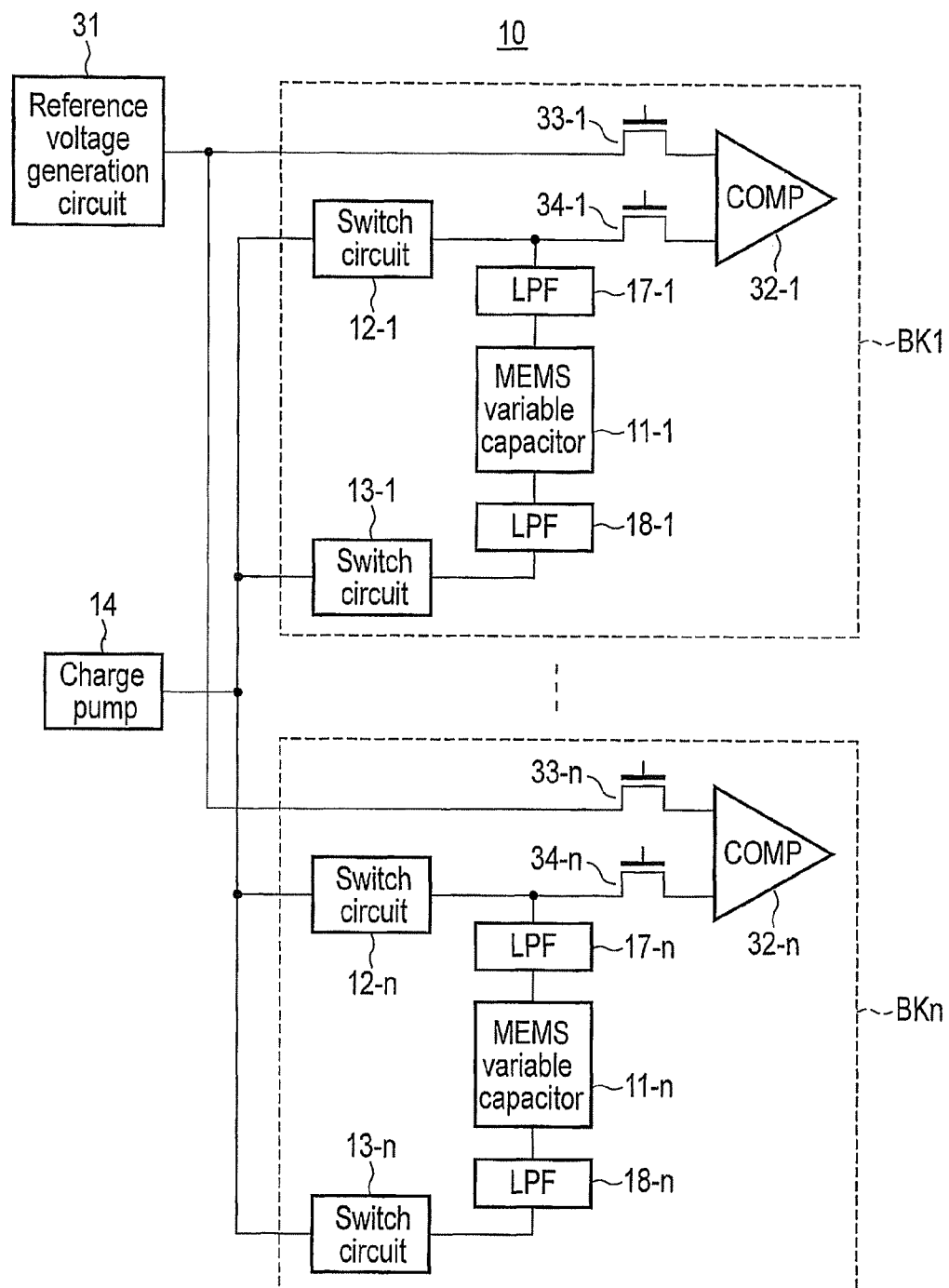
F I G. 14

SEMICONDUCTOR DEVICE AND DRIVE METHOD OF ELECTROSTATIC ACTUATOR

CROSS REFERENCE TO RELATED APPLICATIONS

This application is a Continuation Application of PCT Application No. PCT/JP2011/069969, filed Aug. 26, 2011 and based upon and claiming the benefit of priority from Japanese Patent Application No. 2010-192599, filed Aug. 30, 2010, the entire contents of all of which are incorporated herein by reference.

FIELD

Embodiments described herein relate generally to a semiconductor device and a drive method of an electrostatic actuator.

BACKGROUND

As one of techniques for realizing, lightness, low power consumption and highly sophisticated function of recent electronic devices, the technique of micro-electromechanical systems (MEMS) has received much attention. The MEMS is a system having a smaller mechanical element and electronic circuit element combined by a silicon process technique.

An electrostatic actuator using MEMS is used in a radio-frequency (RF) MEMS variable capacitor or RF-MEMS switch. For example, the electrostatic actuator includes a lower electrode, an upper electrode and an insulating film disposed between the electrodes. In order to shift the electrostatic actuator from an up state to a down state, a potential difference is applied between the lower electrode and the upper electrode to drive the upper electrode.

BRIEF DESCRIPTION OF THE DRAWINGS

FIG. 1 is a block diagram showing a semiconductor device 10 according to one embodiment.
FIG. 2 is a circuit diagram of the semiconductor device 10 shown in FIG. 1.
FIG. 12 is a graph showing difference δV between voltage variations ΔV in the up state and down state.
FIG. 13 is a block diagram showing another example of the semiconductor device 10.
FIG. 14 is a block diagram showing still another example of the semiconductor device 10.

DETAILED DESCRIPTION

Figure 3:
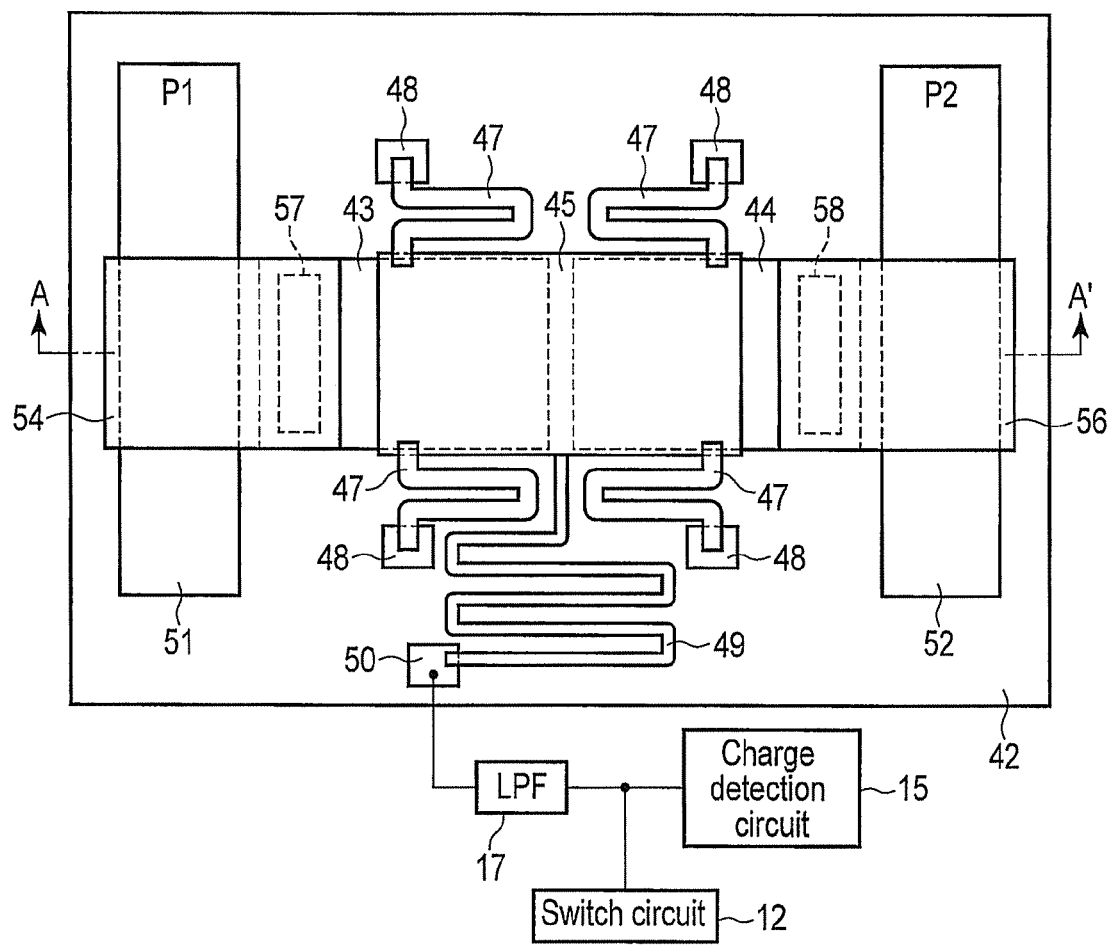
FIG. 3 is a plan view of a MEMS variable capacitor 11.

In general, according to one embodiment, there is provided a semiconductor device comprising:
an electrostatic actuator including first and second lower electrodes, an upper electrode supported above the first and second lower electrodes by an anchor and configured to move downwardly, and an insulating film provided between the upper electrode and the first and second lower electrodes, the first lower electrode and upper electrode configuring a first variable capacitance element, the second lower electrode and upper electrode configuring a second variable capacitance element;
a first fixed capacitance element connected to the first lower electrode;
a second fixed capacitance element connected to the second lower electrode; and
a detection circuit connected to the upper electrode and configured to detect a charge amount stored in the insulating film.

The embodiments will be described hereinafter with reference to the accompanying drawings. In the description which follows, the same or functionally equivalent elements are denoted by the same reference numerals, to thereby simplify the description.

[1] Whole Configuration

FIG. 1 is a block diagram showing the configuration of a semiconductor device 10 according to one embodiment. The semiconductor device 10 includes an electrostatic actuator 11, two switch circuits 12 and 13 configured to drive the electrostatic actuator 11, a charge pump (CP) 14 that supplies voltage Vhold to the switch circuits 12 and 13, a charge detection circuit 15 that detects a charge amount stored in an insulating film of the electrostatic actuator 11, a voltage generation circuit 16 that generates a necessary voltage for the charge detection operation, two low-pass filters (LPF) 17 and 18, and a control circuit 19 that controls the operation of the semiconductor device 10.

As the electrostatic actuator 11, a MEMS variable capacitor or MEMS switch can be used, and in this embodiment, a case wherein the MEMS variable capacitor is used as an example is explained. The charge pump 14 boosts power source voltage Vdd to generate voltage Vhold higher than power source voltage Vdd.

FIG. 2 is a circuit diagram of the semiconductor device 10 shown in FIG. 1. Next, the detail configurations of the MEMS variable capacitor 11, switch circuits 12 and 13 and charge detection circuit 15 are explained.

[2] Configuration of MEMS Variable Capacitor 11

The MEMS variable capacitor 11 includes two ports P1 and 22, for example, port P1 being connected to a signal line used for transferring a high-frequency signal and port P2 being grounded. The MEMS variable capacitor 11 includes two variable capacitance elements $C_{MEMS1}$ and $C_{MEMS2}$ and two fixed capacitance elements $C_{MIM1}$ and $C_{MIM2}$.

The upper electrodes of variable capacitance elements $C_{MEMS1}$ and $C_{MEMS2}$ are connected to the switch circuit 12 via the low-pass filter 17. Further, $C_{PARA}$ connected to the upper electrodes of variable capacitance elements $C_{MEMS1}$ and $C_{MEMS2}$ expresses a parasitic capacitor such as an interconnection capacitor or junction capacitor. Variable capacitance element $C_{MEMS1}$ is connected in series with variable capacitance element $C_{MEMS2}$. The lower electrode of $C_{MIM1}$ is connected to port P1. Variable capacitance element $C_{MEMS2}$ is connected in series with fixed capacitance element $C_{MIM2}$. The lower electrode of $C_{MIM2}$ is connected to port P2. The lower electrode of variable capacitance element $C_{MEMS1}$ is connected to the switch circuit 13 via resistor R1 and low-pass filter 18. The lower electrode of variable capacitance element $C_{MEMS2}$ is connected to the switch circuit 13 via resistor R2 and low-pass filter 18.

The MEMS variable capacitor 11 is configured by serially connecting fixed capacitance element $C_{MIM1}$, variable capacitance element $C_{MEMS1}$, variable capacitance element $C_{MEMS2}$ and fixed capacitance element $C_{MIM2}$ between ports P1 and P2. The capacitance of the MEMS variable capacitor 11 becomes equal to the total capacitance of the four capacitance elements.

Fixed capacitance elements $C_{MIM1}$ and $C_{MIM2}$ are provided to enhance withstanding voltages of variable capacitance elements $C_{MEMS1}$ and $C_{MEMS2}$. Resistors R1 and R2 play a role of preventing the lower electrodes of variable capacitance elements $C_{MEMS1}$ and $C_{MEMS2}$ from being short-circuited.

The MEMS variable capacitor 11 with the above configuration can enhance a hot switching characteristic. The hot switching is to switch the state from the up state to the down state or from the down state to the up state while signal power is being supplied to the MEMS variable capacitor. Generally, at the hot switching time, the reliability of the MEMS variable capacitor is degraded. However, the MEMS variable capacitor 11 of this embodiment having a plurality of capacitance elements connected between ports P1 and P2 can reduce voltages applied to variable capacitance elements $C_{MEMS1}$ and $C_{MEMS2}$.

Figure 4:
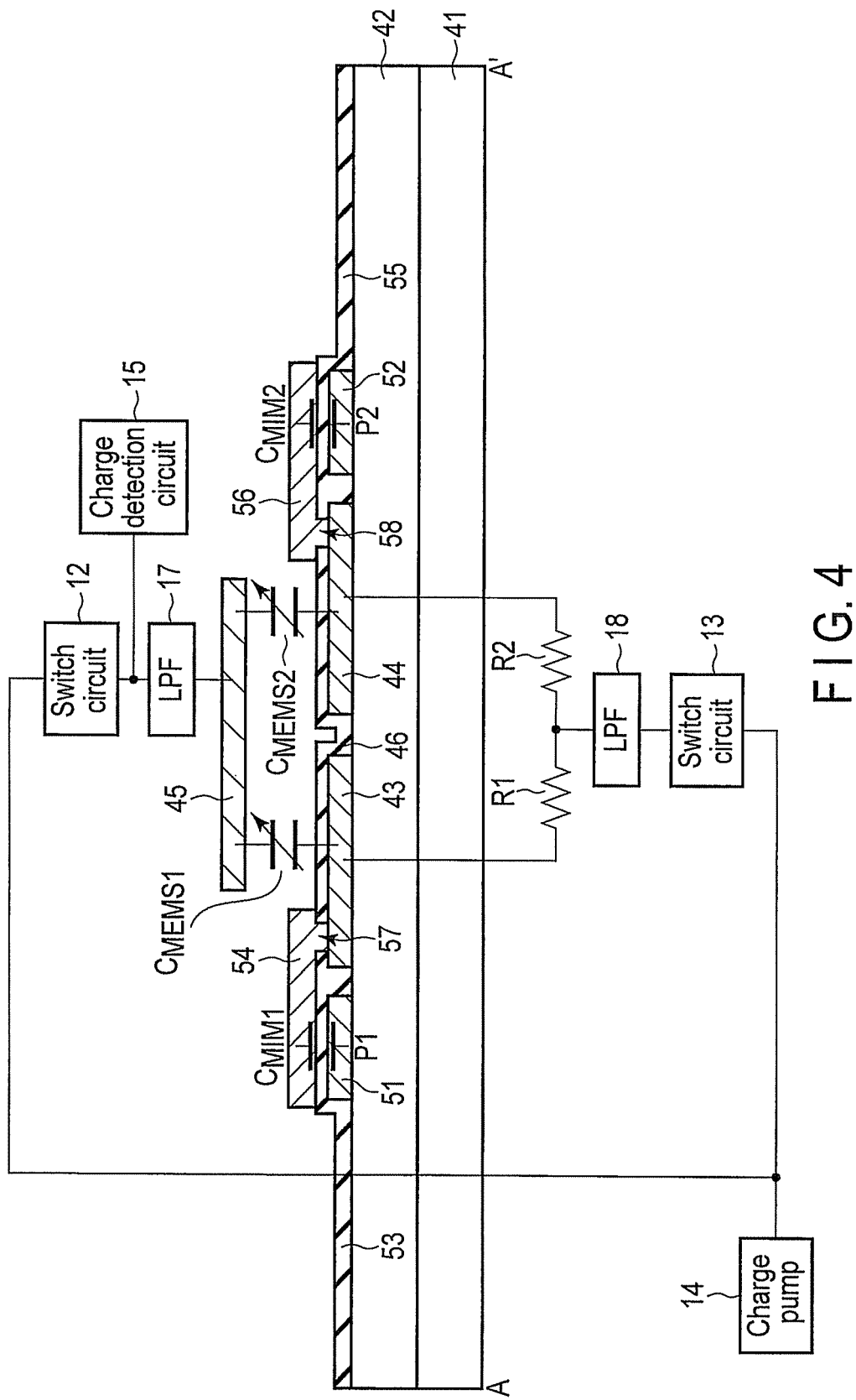
FIG. 4 is a cross-sectional view of the MEMS variable capacitor 11 taken along line A-A' of FIG. 3.

Next, one example of the configuration of the MEMS variable capacitor 11 is explained. FIG. 3 is a plan view of the MEMS variable capacitor 11. FIG. 4 is a cross-sectional view of the MEMS variable capacitor 11 taken along line A-A' of FIG. 3.

On a substrate 41 such as a silicon substrate 41, for example, an insulating layer 42 formed of silicon oxide is formed and a MEMS variable capacitor 11 is formed on the insulating layer 42. On the insulating layer 42, two lower electrodes 43 and 44 separately arranged are formed. An upper electrode 45 is arranged above the lower electrodes 43 and 44. An insulating film 46 is formed on the lower electrodes 43 and 44 to prevent the lower electrodes 43 and 44 from being made to electrically contact the upper electrode 45. The insulating film 46 may be arranged between the lower electrodes 43 and 44 and the upper electrode 45 and, for example, may be arranged under the upper electrode 45.

Four springs 47 are connected to the upper electrode 45. The end portion of each spring 47 is supported by an anchor 48. Therefore, the upper electrode 45 arranged above the lower electrodes 43 and 44 can move downwardly by electrostatic attraction. The lower electrode 43 and upper electrode 45 configure variable capacitance element $C_{MEMS1}$. The lower electrode 44 and upper electrode 45 configure variable capacitance element $C_{MEMS2}$. An interconnection 49 with the spring structure is electrically connected to the upper electrode 45. The end portion of the interconnection 49 is supported by a conductive anchor 50.

On the insulating layer 42, lower electrodes 51 and 52 are formed to sandwich the lower electrodes 43 and 44. The lower electrode 51 functions as port P1 and the lower electrode 52 functions as port P2. An insulating film 53 is formed on the lower electrode 51. An upper electrode 54 is formed on the insulating film 53. The lower electrode 51, insulating film 53 and upper electrode 54 configure fixed capacitance element $C_{MIM1}$. The upper electrode 54 is formed to overlap the lower electrode 43 and is electrically connected to the lower electrode 43. In FIG. 3, a connecting portion 57 between the upper electrode 54 and lower electrode 43 is indicated by broken lines. The lower electrodes 51 and 43 are isolated from each other by the insulating film 53.

An insulating film 55 is formed on the lower electrode 52. An upper electrode 56 is formed on the insulating film 55. The lower electrode 52, insulating film 55 and upper electrode 56 configure fixed capacitance element $C_{MIM2}$. The upper electrode 56 is formed to overlap the lower electrode 44 and is electrically connected to the lower electrode 44. In FIG. 3, a connecting portion 58 between the upper electrode 56 and lower electrode 44 is indicated by broken lines. The lower electrodes 52 and 44 are isolated from each other by the insulating film 53.

The capacitance of the MEMS variable capacitor 11 changes by a change from the up state to the down state or from the down state to the up state. The up state (open state) is a state in which the upper electrode 45 is not driven and the upper electrode 45 and lower electrode 43 (or 44) are separated. The down state (closed state) is a state in which the upper electrode 45 is driven to a lower portion and the upper electrode 45 and lower electrode 43 (or 44) contact each other with the insulating film 46 disposed therebetween.

[3] Configurations of Switch Circuits 12 and 13

Next, the configurations of the switch circuits 12 and 13 are explained. The switch circuits 12 and 13 are drive circuits for driving the MEMS variable capacitor 11. The configurations of the switch circuits 12 and 13 are the same and the switch circuit 12 is explained as an example below. In FIG. 2, only the circuit configuration of the switch circuit 12 is shown.

As shown in FIG. 2, the switch circuit 12 includes four switch elements 21 to 24, two local boosters 25 and 26 and boost capacitor $C_{BT}$. As the switch elements 21 and 22, metal semiconductor field-effect transistors (MOSFETs) of high withstanding voltages are used and, for example, N-channel MOSFETs (NMOSFETs) are used. As the switch elements 23 and 24, for example, NMOSFETs are used.

The drain of NMOSFET 21 is connected to an output of the charge pump 14 and the source of NMOSFET 21 is connected to a first electrode of boost capacitor $C_{BT}$ via node N1. The gate voltage of NMOSFET 21 is controlled by the local booster (LB) 25.

The drain of NMOSFET 22 is connected to the output of the charge pump 14 and the source of NMOSFET 22 is connected to a second electrode of boost capacitor $C_{BT}$ via node N2. The gate voltage of NMOSFET 22 is controlled by the local booster 26.

Node N1 is connected to the first discharging circuit 23. The discharging circuit 23 discharges node N1 to ground voltage Vss based on a control signal from the control circuit 19. Node N2 is connected to the second discharging circuit 24. The discharging circuit 24 discharges node N2 to ground voltage Vss based on a control signal from the control circuit 19. Each of the discharging circuits 23 and 24 is configured by, for example, an NMOSFET.

[4] Configuration of Charge Detection Circuit 15

Next, the configuration of the charge detection circuit 15 is explained. When the MEMS variable capacitor 11 is repeatedly set in the up state and down state, there occurs so-called charging in which charge is stored in the insulating film 46 between the upper electrode 45 and the lower electrodes 43 and 44. When the stored charge amount exceeds a certain threshold value, there occurs so-called sticktion defect in which the upper electrode 45 is not separated from the insulating film 46. The charge detection circuit 15 determines the charge amount stored in the insulating film 46 based on the capacitance of the MEMS variable capacitor 11.

As a charge detection method, a method is provided for setting an application voltage between the upper electrode 45 and the lower voltage 43 (or 44) of the MEMS variable capacitor 11 to constant monitor voltage Vmon after the MEMS variable capacitor 11 is set in the down state. At this time, the charge amount stored in the insulating film 46 can be estimated according to whether or not the upper electrode 45 is separated from the insulating film 46.

As shown in FIG. 2, the charge detection circuit 15 includes a reference voltage generation circuit 31, comparator (COMP) 32 and two switch elements 33 and 34. As the switch elements 33 and 34, for example, NMOSFETs are used.

The reference voltage generation circuit 31 generates reference voltage Vref. An output of the reference voltage generation circuit 31 is connected to a first input terminal of the comparator 32 via node N3 and NMOSFET 33. Node N1 of the switch circuit 12 is connected to a second input terminal of the comparator 32 via NMOSFET 34.

The charge detection circuit 15 is connected to one of the upper electrode and lower electrode configuring the electrostatic actuator that has smaller parasitic capacitance. In this embodiment, fixed capacitance elements $C_{MIM1}$ and $C_{MIM2}$ are respectively connected to the lower electrodes 43 and 44 and the capacitances of fixed capacitance elements $C_{MIM1}$ and $C_{MIM2}$ are larger in comparison with that of parasitic capacitor $C_{PARA}$ since the fixed capacitance elements are capacitors of the metal-insulator-metal (MIM) structure. Therefore, the charge detection circuit 15 is connected to the upper electrode 45 whose parasitic capacitance is smaller than that of the lower electrode.

Figure 5:
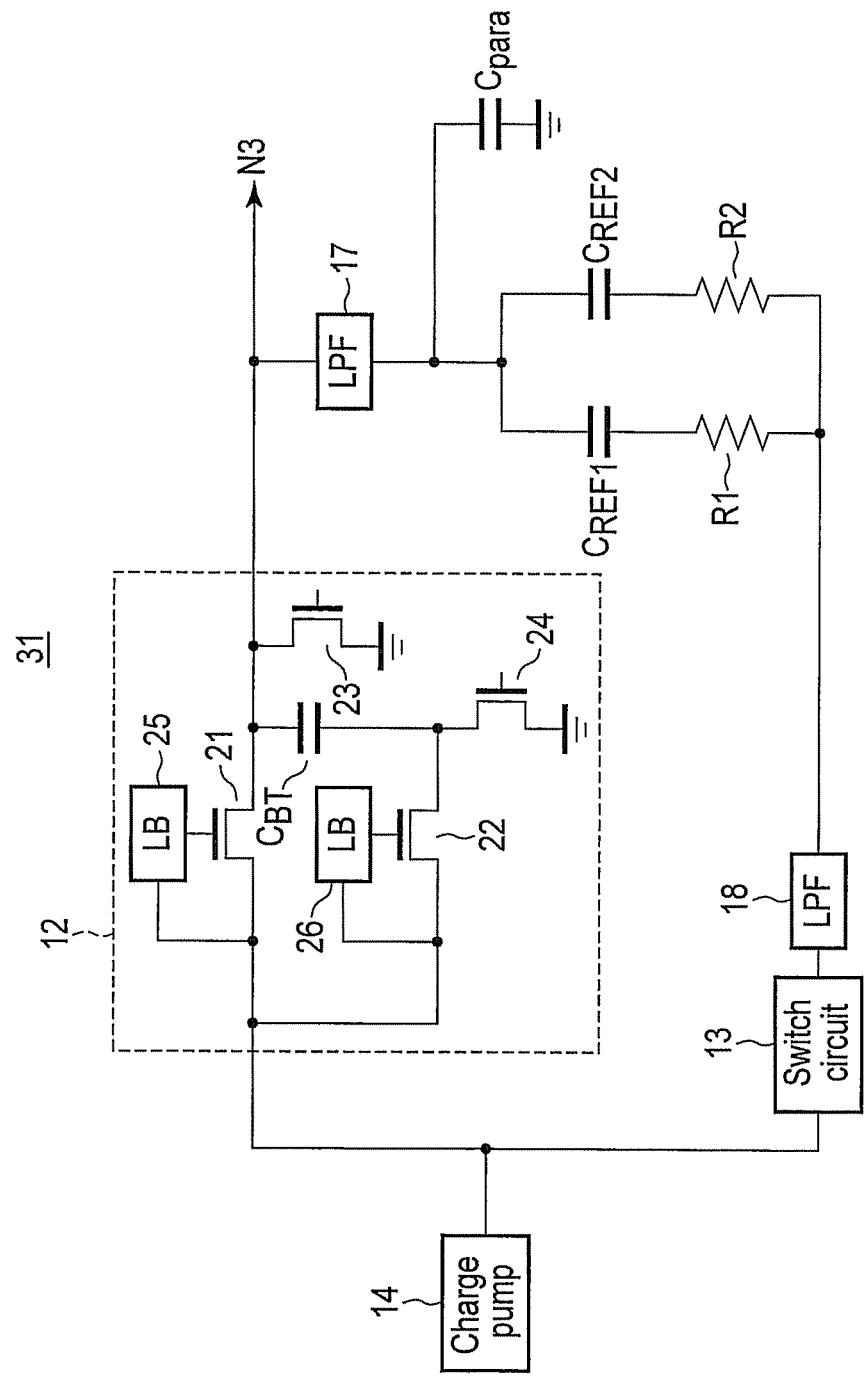
FIG. 5 is a circuit diagram showing a reference voltage generation circuit 31.

FIG. 5 is a circuit diagram showing the configuration of the reference voltage generation circuit 31. The reference voltage generation circuit 31 includes a charge pump 14, switch circuits 12 and 13, low-pass filters (LPFs) 17 and 18, resistors R1 and R2, parasitic capacitor $C_{PARA}$ and two fixed capacitance elements $C_{REF1}$ and $C_{REF2}$. The charge pump 14, switch circuits 12 and 13, low-pass filters 17 and 18, resistors R1 and R2 and parasitic capacitor $C_{PARA}$ configuring the reference voltage generation circuit 31 have the same configurations as those of the portions indicated by the same symbols in FIG. 2 and the connection relationship thereof is the same as that in FIG. 2. The charge pump 14 shown in FIG. 5 can be commonly used with the charge pump 14 shown in FIG. 2. The switch circuits 12 and 13 of FIG. 5 are controlled by the control circuit 19 to perform the same operation as that by the switch circuits 12 and 13 of FIG. 2.

Fixed capacitor $C_{REF1}$ can be expressed by the following equation.

$$C_{REF1}=(C_{MEMS1}\_up+C_{MEMS1}\_dn)/2$$

$C_{MEMS1}$_up indicates the capacitance of variable capacitance element $C_{MEMS1}$ when the MEMS variable capacitor 11 is set in the up state. $C_{MEMS1}$_dn indicates the capacitance of variable capacitance element $C_{MEMS1}$ when the MEMS variable capacitor 11 is set in the down state.

Fixed capacitor $C_{REF2}$ can be expressed by the following equation.

$$C_{REF2}=(C_{MEMS2}\_up+C_{MEMS2}\_dn)/2$$

$C_{MEMS2}$_up indicates the capacitance of variable capacitance element $C_{MEMS2}$ when the MEMS variable capacitor 11 is set in the up state. $C_{MEMS2}$_dn indicates the capacitance of variable capacitance element $C_{MEMS2}$ when the MEMS variable capacitor 11 is set in the down state.

The reference voltage generation circuit 31 with the above configuration can generate reference voltage Vref that is an intermediate voltage between a voltage of node N1 when the MEMS variable capacitor 11 is set in the up state and a voltage of node N1 when the MEMS variable capacitor 11 is set in the down state.

[5-1] Operation 1:

First, the operation of the MEMS variable capacitor 11 is explained. In the up state, a potential difference between the upper electrode 45 and the lower electrode 43 (or 44) is less than a pull-in voltage. The pull-in voltage is a voltage required for the upper electrode 45 to be moved downwardly and is a voltage that causes electrostatic attraction for attracting the upper electrode 45 towards the lower electrode 43 to become larger than the restoring force of the spring 47. The down state can be realized by, for example, causing the switch circuit 12 to apply ground voltage Vss to the upper electrode 45 and causing the switch circuit 13 to apply ground voltage Vss to the lower electrodes 43 and 44. As a concrete operation, NMOSFET 23 is turned on to discharge node N1 to ground voltage Vss in each of the switch circuits 12 and 13.

As a method for realizing the down state, a method for applying an electric field (downward electric field) acting from the upper electrode 45 to the lower electrode 43 between the upper electrode 45 and the lower electrode 43 and a method for performing the reverse operation are provided. First, the method for applying the downward electric field is explained.

NMOSFETs 21 and 22 of the switch circuit 12 are operated in the following sequence in order to drive the MEMS variable capacitor 11 (set the same to the down state).

(1) NMOSFET 21: on
(2) NMOSFET 21: off
(3) NMOSFET 22: on

In step (1), boost capacitor $C_{BT}$ is charged by the charge pump 14 to set the voltage of node N1 near voltage Vhold. Voltage Vhold is a hold voltage of the MEMS variable capacitor 11 and is set less than the pull-in voltage. Therefore, at this time, the MEMS variable capacitor 11 is kept in the up state. The pull-in voltage is a voltage required for the upper electrode 45 to be moved downwardly. The hold voltage is a voltage required for holding a state obtained after the upper electrode 45 is moved downwardly and contacts the insulating film 46.

Subsequently, NMOSFET 21 is turned off in step (2). Then, the potential of node N2 is set near voltage Vhold in step (3). At this time, the potential of node N1 is boosted to drive voltage Vact higher than the pull-in voltage by capacitive coupling of boost capacitor $C_{BT}$. As a result, the down state of the MEMS variable capacitor 11 is realized. The lower electrodes 43 and 44 are kept at 0 V by NMOSFET 23 of the switch circuit 13.

After this, NMOSFET 21 is turned on, NMOSFET 22 is turned off and NMOSFET 24 is turned on. As a result, the potential of node N1 is set near voltage Vhold and the down state of the MEMS variable capacitor 11 is held.

Figure 6:
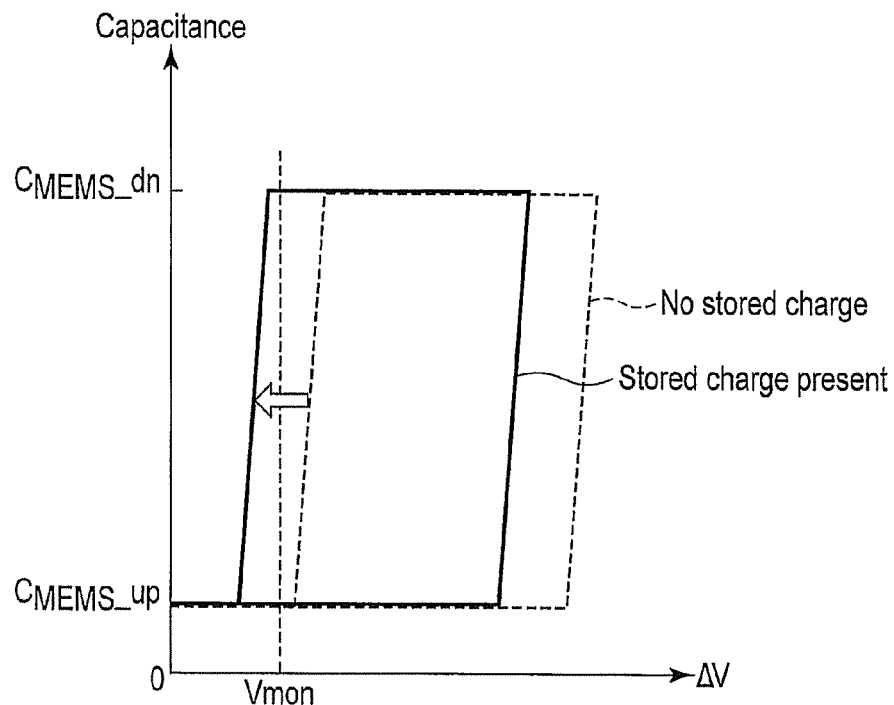
FIG. 6 is a diagram showing the relationship between the capacitance of the MEMS variable capacitor 11 and an applied voltage.

Next, the operation of detecting a charge amount stored in the MEMS variable capacitor 11 is explained. As described before, when the MEMS variable capacitor 11 is repeatedly set in the up state and down state, charge is stored in the insulating film 46 between the upper electrode 45 and the lower electrodes 43 and 44. FIG. 6 is a diagram showing the relationship between the capacitance of the MEMS variable capacitor 11 and an applied voltage. In FIG. 6, a case wherein almost no charge is stored in the insulating film 46 between the upper electrode 45 and the lower electrodes 43 and 44 (broken lines) and a case wherein charge is stored in the insulating film 46 (solid lines) are shown. The abscissa in FIG. 6 represents potential difference ΔV between the upper electrode 45 and the lower electrodes 43 and 44 and the ordinate represents the capacitance of the MEMS variable capacitor 11.

As shown in FIG. 6, when almost no charge is stored in the insulating film 46, a voltage (pull-out voltage) for separating the upper electrode 45 apart from the insulating film 46 becomes higher. The pull-out voltage becomes lower as more charge is stored in the insulating film 46. In this embodiment, a charge amount stored in the insulating film 46 is detected according to whether or not the upper electrode 45 is separated from the insulating film 46 when potential difference ΔV is set at monitor voltage Vmon. The upper limit of monitor voltage Vmon is set to a voltage lower than the pull-out voltage set when almost no charge is stored in the insulating film 46. Further, the lower limit of monitor voltage Vmon can be set to a desired voltage higher than 0 V and is set to a lower voltage to detect a state in which a larger charge is stored in the insulating film 46. On the other hand, it is set to a higher voltage if a state in which a smaller charge is stored in the insulating film 46 is detected. Monitor voltage Vmon is generated by the voltage generation circuit 16 of FIG. 1.

Figure 7:
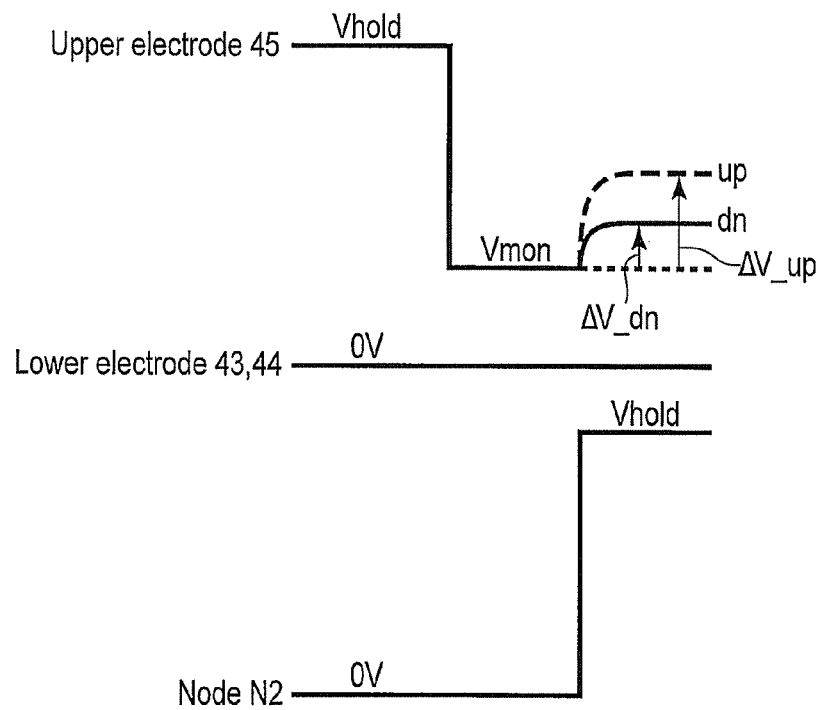
FIG. 7 is a timing chart showing the voltage relationship at the charge detection operation time.

FIG. 7 is a timing chart showing the voltage relationship at the charge detection operation time. FIG. 7 shows an example of the charge detection operation when a downward electric field is applied.

First, the MEMS variable capacitor 11 is set in the down state. At this time, the switch circuit 13 sets the potentials of the lower electrodes 43 and 44 to ground voltage Vss (=0 V). This is realized by turning on NMOSFET 23 of the switch circuit 13. Further, the switch circuit 12 sets the potential of the upper electrode 45 to voltage Vhold after applying voltage Vact to the upper electrode 45. As a result, the MEMS variable capacitor 11 is set to the down state.

Next, the control circuit 19 turns on NMOSFET 35 to apply monitor voltage Vmon to the upper electrode 45. At this time, NMOSFET 21 of the switch circuit 12 is kept off. Likewise, the control circuit 19 also applies monitor voltage Vmon to the reference voltage generation circuit 31.

Then, NMOSFET 22 of the switch circuit 12 is turned on and NMOSFET 24 is turned off. As a result, node N2 of the switch circuit 12 is set to voltage Vhold. In this case, the relationship of $C_{MEMS1\_up} < C_{MEMS1\_dn}$ and $C_{MEMS2\_up} < C_{MEMS2\_dn}$ is set. Therefore, if the MEMS variable capacitor 11 is set in the up state (up), the voltage of the upper electrode 45 greatly rises and if the MEMS variable capacitor 11 is set in the down state (dn), the voltage of the upper electrode 45 slightly rises. That is, if a voltage variation in the up state is ΔV_up and a voltage variation in the down state is ΔV_dn, the relationship of ΔV_up>ΔV_dn is set.

ΔV_up is expressed by the following equation (1).

$$\Delta V\_up = \frac{C_{BT}}{C_{BT} + C_{MEMS1\_up} + C_{MEMS2\_up} + C_{para}} Vhold \quad (1)$$

ΔV_dn is expressed by the following equation (2).

$$\Delta V\_dn = \frac{C_{BT}}{C_{BT} + C_{MEMS1\_dn} + C_{MEMS2\_dn} + C_{para}} Vhold \quad (2)$$

Reference voltage Vref is applied from the reference voltage generation circuit 31 to the first input terminal of the comparator 32 by turning on NMOSFET 33. Since the reference voltage generation circuit 31 performs the same operation as that of the switch circuits 12 and 13, reference voltage Vref is set at an intermediate voltage between "Vmon+ΔV_up" and "Vmon+ΔV_dn". The comparator 32 compares the voltage (voltage of node N1) of the upper electrode 45 with reference voltage Vref. Based on the comparison result, whether the MEMS variable capacitor 11 is set in the up state or down state can be determined while monitor voltage Vmon is being applied to the upper electrode 45. The determination result is transmitted to the control circuit 19.

The control circuit 19 determines the direction of an electric field between the upper electrode and the lower electrode based on the above determination result when the MEMS variable capacitor 11 is driven. That is, if it is determined as the result of the detection operation that the MEMS variable capacitor 11 is set in the up state, the control circuit 19 drives the MEMS variable capacitor 11 without changing the direction of the electric field between the upper electrode and the lower electrode of the MEMS variable capacitor 11 since charge greater than or equal to the threshold value is not stored in the insulating film 46. On the other hand, if it is determined as the result of the detection operation that the MEMS variable capacitor 11 is set in the down state, the control circuit 19 changes the direction of the electric field between the upper electrode and the lower electrode of the MEMS variable capacitor 11 and drives the MEMS variable capacitor 11 since charge greater than or equal to the threshold value is stored in the insulating film 46.

Embodiment

The experiment result of the semiconductor device 10 according to the operation 1 of this embodiment is explained below. In measuring the experiment result of the semiconductor device 10, numerals indicated in the following table are used. Further, measurements of three patterns are made while the condition is changed as shown by (1) to (3).

TABLE 1

|   | $C_{MEMS}$_up (fF) | $C_{MEMS}$_dn (fF) | $C_{BT}$ (fF) | $C_{para}$ (fF) |
|---|---|---|---|---|
| 1 | 88.308 | 1867.04 | 4900 | 2000 |
| 2 | 176.64 | 3734 | 8400 | 2000 |
| 3 | 264.96 | 5601.04 | 11900 | 2000 |

$C_{MEMS}$_up indicates the capacitance of variable capacitance element $C_{MEMS1}$ or $C_{MEMS2}$ while the MEMS variable capacitor 11 is set in the up state. $C_{MEMS}$_dn indicates the capacitance of variable capacitance element $C_{MEMS1}$ or $C_{MEMS2}$ while the MEMS variable capacitor 11 is set in the down state. $C_{BT}$ indicates the capacitance of the boost capacitor of the switch circuit 12. $C_{PARA}$ indicates parasitic capacitance.

Figure 8:
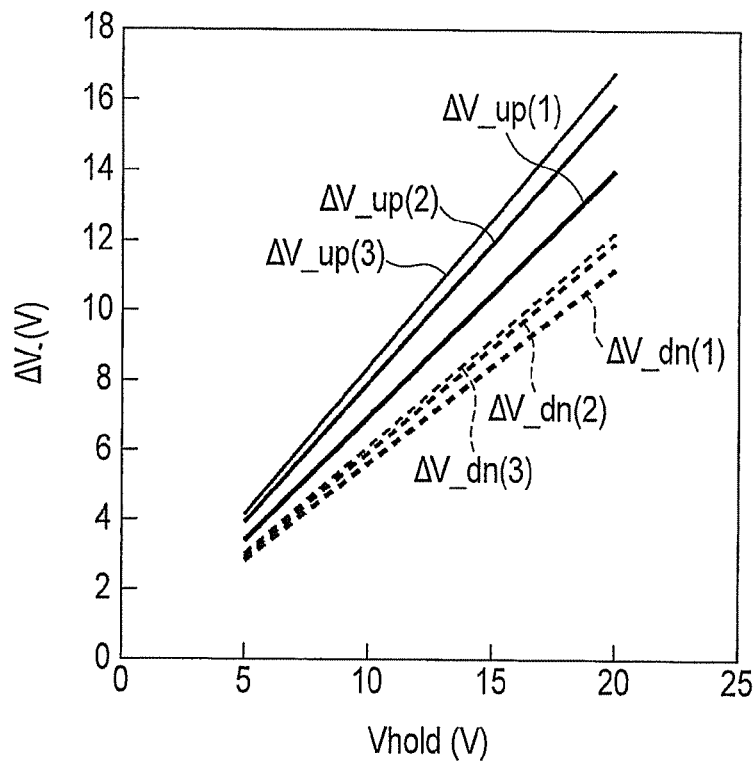
FIG. 8 is a graph showing voltage variations ΔV in the up state and down state.

FIG. 8 is a graph showing voltage variation ΔV_up in the up state and voltage variation ΔV_dn in the down state. The abscissa of FIG. 8 indicates voltage Vhold (V) and the ordinate indicates voltage variation ΔV. Numerals (1) to (3) in FIG. 8 correspond to the numerals of the above table.

As is understood from FIG. 8, the difference between ΔV_up and ΔV_dn becomes larger in any one of the three conditions (1) to (3). Therefore, the up state and down state of the MEMS variable capacitor 11 can be determined in the charge detection operation.

Figure 9:
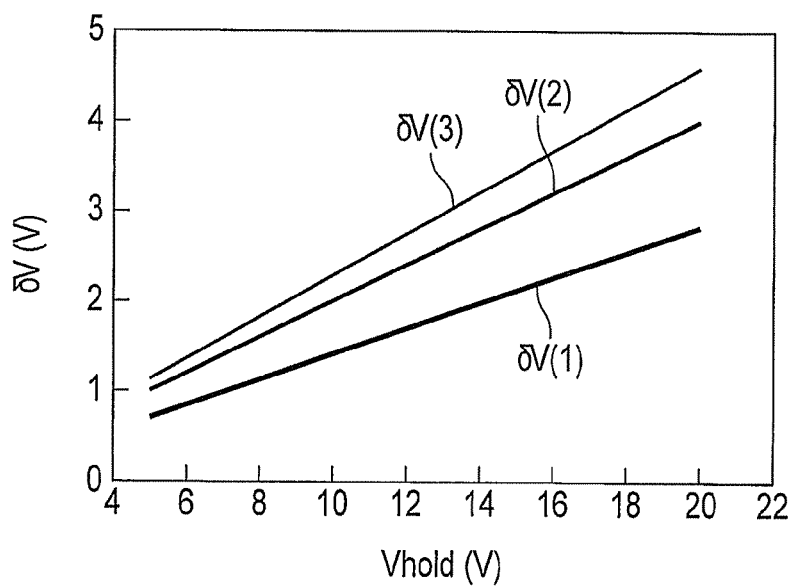
FIG. 9 is a graph showing difference δV between voltage variations ΔV in the up state and down state.

FIG. 9 is a graph showing potential difference δV between voltage variation ΔV_up in the up state and voltage variation ΔV_dn in the down state. The abscissa of FIG. 9 represents voltage Vhold (V) and the ordinate represents potential difference δV (V). Potential difference δV is expressed by the following equation.

$$\delta V = \Delta V\_up - \Delta V\_dn$$

As is understood from FIG. 9, potential difference δV becomes larger in any one of the three conditions (1) to (3).

[5-2] Operation 2:

Next, an example in which an electric field (downward electric field) acting from the lower electrode 43 to the upper electrode 45 is applied between the lower electrode 43 and the upper electrode 45 when the MEMS variable capacitor 11 is driven is explained.

The operation of applying an upward electric field to set the MEMS variable capacitor 11 to the down state may be realized by reversing the operations of the switch circuits 12 and 13 in the operation 1 described before.

Figure 10:
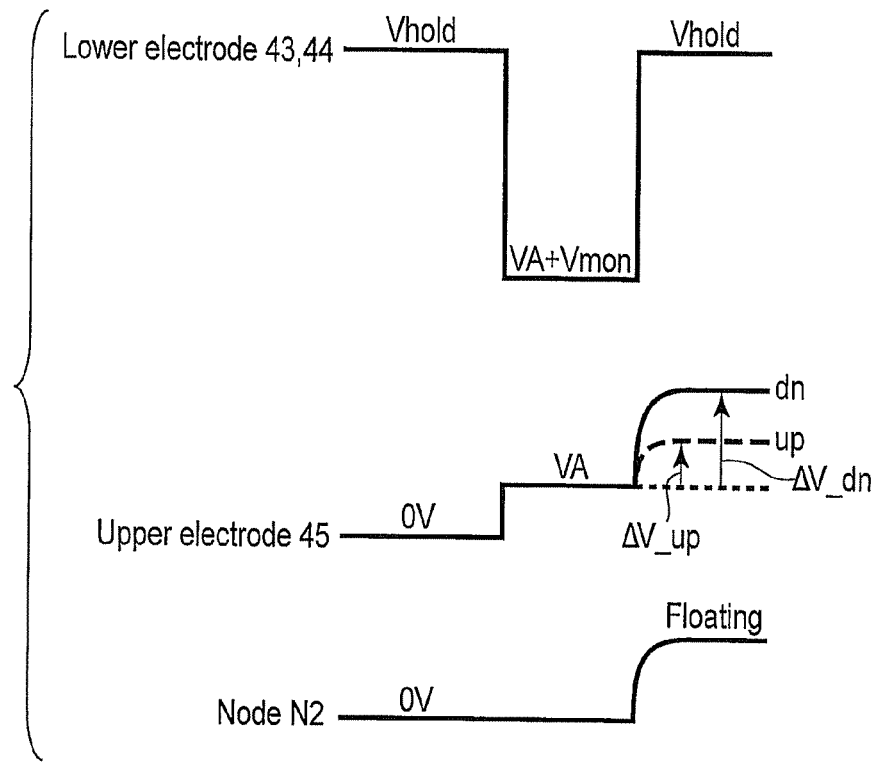
FIG. 10 is a timing chart showing the voltage relationship at the charge detection operation time.

An example of the charge detection operation when an electric field is upwardly applied is explained below. FIG. 10 is a timing chart showing the voltage relationship at the charge detection operation time.

First, the MEMS variable capacitor 11 is set to the down state. At this time, the switch circuit 12 sets the potential of the upper electrode 45 to 0 V. This is realized by turning on NMOSFET 23 of the switch circuit 12. Further, the switch circuit 13 sets the potentials of the lower electrodes 43 and 44 to voltage Vhold after applying voltage Vact to the lower electrodes 43 and 44. As a result, the MEMS variable capacitor 11 is set to the down state.

Subsequently, the control circuit 19 turns on NMOSFET 36 and applies fixed voltage VA to the upper electrode 45. Likewise, the control circuit 19 also applies fixed voltage VA to the reference voltage generation circuit 31. Further, the control circuit 19 turns on NMOSFETs 37 and 38 and applies voltage "VA+Vmon" to the lower electrodes 43 and 44. Fixed voltage VA is generated by the voltage generation circuit 16. Fixed voltage VA is set at substantially the same voltage as monitor voltage Vmon. As a result, the operation point in charge detection can be set to the same point as in a case where the upward electric field is applied. If the operation points are not required to be set to the same point, VA may be set to 0 V.

Next, the control circuit 19 turns on NMOSFET 21 of the switch circuit 13 and applies voltage Vhold to the lower electrodes 43 and 44. Further, the control circuit 19 turns off NMOSFETs 22 and 24 of the switch circuit 12 to make node N2 of the switch circuit 12 float. The reason why node N2 of the switch circuit 12 is made float is to suppress an influence by boost capacitor $C_{BT}$ of the switch circuit 12.

At this time, if the MEMS variable capacitor 11 is set in the down state (dn), the voltage of the upper electrode 45 greatly rises and if the MEMS variable capacitor 11 is set in the up state (up), the voltage of the upper electrode 45 slightly rises. That is, if a voltage variation in the up state is ΔV_up and a voltage variation in the down state is ΔV_dn, the relationship of ΔV_up<ΔV_dn is set.

ΔV_up is expressed by the following equation (3).

$$\Delta V\_up = \frac{C_{MEMS1}\_up + C_{MEMS2}\_up}{C_J + C_{MEMS1}\_up + C_{MEMS2}\_up + C_{para}}(Vhold - VA - Vmon) \quad (3)$$

$$\approx \frac{C_{MEMS1}\_up + C_{MEMS2}\_up}{C_{MEMS1}\_up + C_{MEMS2}\_up + C_{para}}(Vhold - VA - Vmon)$$

$$\left(C_J \equiv \frac{C_{BT}C_{junc}}{C_{BT} + C_{junc}} << C_{para}\right)$$

ΔV_dn is expressed by the following equation (4).

$$\Delta V\_dn = \frac{C_{MEMS1}\_dn + C_{MEMS2}\_dn}{C_J + C_{MEMS1}\_dn + C_{MEMS2}\_dn + C_{para}}(Vhold - VA - Vmon) \quad (4)$$

$$\approx \frac{C_{MEMS1}\_dn + C_{MEMS2}\_dn}{C_{MEMS1}\_dn + C_{MEMS2}\_dn + C_{para}}(Vhold - VA - Vmon)$$

A symbol "≡" means definition. A symbol "<<" means that one side is extremely larger than the other side. $C_{junc}$ indicates junction capacitance of the MOSFET.

Reference voltage Vref is applied from the reference voltage generation circuit 31 to the first input terminal of the comparator 32 by turning on NMOSFET 33. Since the reference voltage generation circuit 31 performs the same operation as that of the switch circuits 12 and 13, reference voltage Vref is set to an intermediate voltage between "VA+ΔV_up" and "VA+ΔV_dn". The comparator 32 compares the voltage (voltage of node N1) of the upper electrode 45 with reference voltage Vref. Based on the comparison result, whether the MEMS variable capacitor 11 is set in the up state or down state can be determined while monitor voltage Vmon is being applied between the upper electrode 45 and the lower electrodes 43 and 44. The determination result is transmitted to the control circuit 19. The control circuit 19 determines the direction of an electric field between the upper electrode and the lower electrode based on the above determination result when the MEMS variable capacitor 11 is driven.

Embodiment

The experiment result of the semiconductor device 10 according to the operation 2 of this embodiment is explained below. Numerals of parameters used in measuring the experiment result of the semiconductor device 10 are the same as those of the above table.

Figure 11:
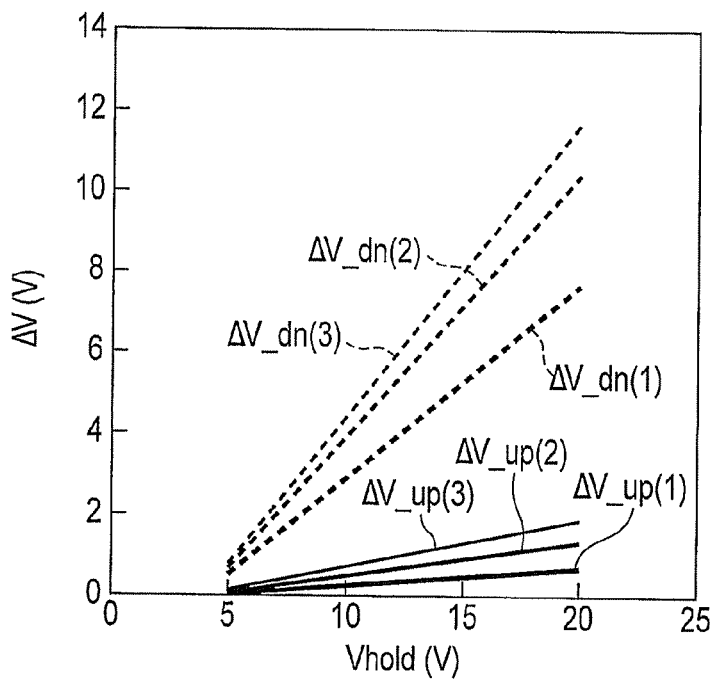
FIG. 11 is a graph showing voltage variations ΔV in the up state and down state.

FIG. 11 is a graph showing voltage variation ΔV_up in the up state and voltage variation ΔV_dn in the down state. The abscissa of FIG. 11 represents voltage Vhold (V) and the ordinate represents voltage variation ΔV. Numerals (1) to (3) in FIG. 11 correspond to the numerals of the above table.

As is understood from FIG. 11, the difference between ΔV_up and ΔV_dn becomes larger in any one of the three conditions (1) to (3). Therefore, the up state and down state of the MEMS variable capacitor 11 can be determined in the charge detection operation.

FIG. 12 is a graph showing potential difference δV between voltage variation ΔV_up in the up state and voltage variation ΔV_dn in the down state. The abscissa of FIG. 12 represents voltage Vhold (V) and the ordinate represents potential difference δV (V). Potential difference δV is expressed by the following equation.

$$\delta V = \Delta V\_up - \Delta V\_dn$$

As is understood from FIG. 12, potential difference δV becomes larger in any one of the three conditions (1) to (3).

[6] Other Configuration Example

FIG. 13 is a block diagram showing another example of the configuration of the semiconductor device 10. The semiconductor device 10 includes n (n is an integral number larger than one) banks BK1 to BKn. Each bank BK is the same as the circuit of FIG. 1. The charge pump 14, voltage generation circuit 16 and control circuit 19 are commonly used by a plurality of banks BK. Also, in the semiconductor device 10 with the above bank structure, each bank can perform the operation as described before.

Further, as shown in FIG. 14, the reference voltage generation circuit 31 contained in the charge detection circuit 15 may be commonly used by a plurality of banks. In the semiconductor device 10 with the above bank structure, each bank can perform the operation as described before.

[7] Effect

As described above in detail, in the present embodiment, the semiconductor device 10 includes the electrostatic actuator 11 that includes the upper electrode 45, the lower electrode 43 (or 44) and the insulating film 46 disposed between the above electrodes, and the charge detection circuit 15 that detects a charge amount stored in the insulating film 46. The charge detection circuit 15 is connected to one of the upper electrode 45 and lower electrode 43 that has smaller parasitic capacitance (in this embodiment, the upper electrode 45). In the first charge detection operation for applying an electric field downwardly, voltage Vhold is applied to one end of boost capacitor $C_{BT}$ to boost the voltage of the upper electrode 45 while monitor voltage Vmon is being applied to the upper electrode 45. Whether the electrostatic actuator 11 is set in the up state or down state is determined while monitor voltage Vmon is being applied by detecting the voltage variation of the upper electrode 45 at this time by the charge detection circuit 15.

Then, in the second charge detection operation for applying an electric field upwardly, voltage Vhold is applied to the lower electrode 43 and the node of the switch circuit 12 is made float after monitor voltage Vmon is applied to the lower electrode 43. Whether the electrostatic actuator 11 is set in the up state or down state is determined while monitor voltage Vmon is being applied by detecting the voltage variation of the upper electrode 45 at this time by the charge detection circuit 15.

Therefore, according to this embodiment, whether or not the charge amount stored in the insulating film 46 is not less than the threshold value can be determined. When the charge amount is greater than or equal to the threshold value, sticktion defect caused by charging can be prevented by changing the direction of an electric field between the upper electrode 45 and the lower electrode 43. As a result, the reliability of the electrostatic actuator 11 can be enhanced.

Particularly, according to the charge detection method of this embodiment, even when large parasitic capacitors are added to the lower electrodes 43 and 44 of the electrostatic actuator 11, the voltage variation of the upper electrode 45 can be increased. Therefore, whether or not the charge amount stored in the insulating film 46 is not less than the threshold value can be correctly determined. As a result, the reliability of the electrostatic actuator 11 can be enhanced.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A semiconductor device comprising:
   an electrostatic actuator including first and second lower electrodes, an upper electrode supported above the first and second lower electrodes by an anchor and configured to move downwardly, and an insulating film provided between the upper electrode and the first and second lower electrodes, the first lower electrode and upper electrode configuring a first variable capacitance element, the second lower electrode and upper electrode configuring a second variable capacitance element;
   a first fixed capacitance element connected to the first lower electrode;
   a second fixed capacitance element connected to the second lower electrode; and
   a detection circuit connected to the upper electrode and configured to detect a charge amount stored in the insulating film.

2. The device of claim 1, further comprising:
   a drive circuit including a boost capacitor whose first electrode is connected to the upper electrode, the drive circuit being configured to apply a downward electric field between the lower electrodes and the upper electrode to drive the upper electrode downwardly and set the electrostatic actuator in a down state;
   a voltage generation circuit configured to generate a monitor voltage used for determining whether the charge amount stored in the insulating film is not less than a threshold value; and
   a control circuit configured to apply a first voltage to a second electrode of the boost capacitor after applying the monitor voltage to the upper electrode while the electrostatic actuator is kept in the down state,
   wherein the detection circuit detects a degree of voltage variation of the upper electrode when the first voltage is applied to the second electrode of the boost capacitor.

3. The device of claim 2, wherein the electrostatic actuator is set in the down state when the charge amount is not less than the threshold value and is set in the up state when the charge amount is less than the threshold value.

4. The device of claim 3, wherein the voltage variation in the up state is larger than the voltage variation in the down state.

5. The device of claim 2, wherein the control circuit changes a direction of an electric field between the lower electrodes and the upper electrode when the charge amount is not less than the threshold value.

6. The device of claim 1, further comprising:
   a drive circuit configured to apply an upward electric field between the lower electrodes and the upper electrode to drive the upper electrode downwardly and set the electrostatic actuator in a down state;
   a voltage generation circuit configured to generate a monitor voltage used for determining whether the charge amount stored in the insulating film is not less than a threshold value; and a control circuit configured to apply a first voltage to the lower electrodes after applying the monitor voltage to the lower electrodes while the electrostatic actuator is kept in the down state, wherein the detection circuit detects a degree of voltage variation of the upper electrode when the first voltage is applied to the lower electrodes.

7. The device of claim 6, wherein the electrostatic actuator is set in the down state when the charge amount is not less than the threshold value and is set in the up state when the charge amount is less than the threshold value.

8. The device of claim 7, wherein the voltage variation in the up state is smaller than the voltage variation in the down state.

9. The device of claim 6, wherein the control circuit changes a direction of an electric field between the lower electrodes and the upper electrode when the charge amount is not less than the threshold value.

10. A semiconductor device comprising:
an electrostatic actuator including a lower electrode, an upper electrode supported above the lower electrode by an anchor and configured to move downwardly, and an insulating film provided between the upper electrode and the lower electrode;
a detection circuit connected to one of the lower electrode and upper electrode that has smaller parasitic capacitance, and to detect a charge amount stored in the insulating film; and
a low-pass filter connected between the detection circuit and said one of the lower electrode and upper electrode.

11. The device of claim 10, further comprising:
a drive circuit including a boost capacitor whose first electrode is connected to the upper electrode, the drive circuit being configured to apply a downward electric field between the lower electrode and the upper electrode to drive the upper electrode downwardly and set the electrostatic actuator in a down state;
a voltage generation circuit configured to generate a monitor voltage used for determining whether the charge amount stored in the insulating film is not less than a threshold value; and
a control circuit configured to apply a first voltage to a second electrode of the boost capacitor after applying the monitor voltage to the upper electrode while the electrostatic actuator is kept in the down state,
wherein the detection circuit detects a degree of voltage variation of the upper electrode when the first voltage is applied to the second electrode of the boost capacitor.

12. The device of claim 11, wherein the electrostatic actuator is set in the down state when the charge amount is not less than the threshold value and is set in the up state when the charge amount is less than the threshold value.

13. The device of claim 11, wherein the control circuit changes a direction of an electric field between the lower electrode and the upper electrode when the charge amount is not less than the threshold value.

14. The device of claim 10, further comprising:
a drive circuit configured to apply an upward electric field between the lower electrode and the upper electrode to drive the upper electrode downwardly and set the electrostatic actuator in a down state;
a voltage generation circuit configured to generate a monitor voltage used for determining whether the charge amount stored in the insulating film is not less than a threshold value; and
a control circuit configured to apply a first voltage to the lower electrode after applying the monitor voltage to the lower electrode while the electrostatic actuator is kept in the down state,
wherein the detection circuit detects a degree of voltage variation of the upper electrode at the first voltage application time.

15. The device of claim 14, wherein the electrostatic actuator is set in the down state when the charge amount is not less than the threshold value and is set in the up state when the charge amount is less than the threshold value.

16. The device of claim 14, wherein the control circuit changes a direction of an electric field between the lower electrode and the upper electrode when the charge amount is not less than the threshold value.

17. A drive method of an electrostatic actuator including a lower electrode, an upper electrode supported above the lower electrode by an anchor and configured to move downwardly, and an insulating film provided between the lower electrode and the upper electrode, comprising:
applying a downward electric field between the lower electrode and the upper electrode,
driving the upper electrode downwardly to set the electrostatic actuator in a down state,
applying a monitor voltage to the upper electrode to determine whether a charge amount stored in the insulating film is not less than a threshold value,
applying a first voltage to a second electrode of a boost capacitor whose first electrode is connected to the upper electrode, and
detecting a degree of voltage variation of the upper electrode.

18. The method of claim 17, further comprising:
comparing the voltage variation with a reference value; and
determining that the charge amount is not less than the threshold value when the voltage variation is greater than the reference value.

19. The method of claim 18, further comprising changing a direction of an electric field between the lower electrode and the upper electrode when the charge is not less than the threshold value.

20. The method of claim 18, wherein the electrostatic actuator is set in the down state when the charge is not less than the threshold value and is set in the up state when the charge is less than the threshold value.

21. The device of claim 1, further comprising a low-pass filter connected between the upper electrode and the detection circuit.

22. The device of claim 1, wherein each of the first and second lower electrodes is not connected to the detection circuit.

23. The device of claim 10, wherein the other of the lower electrode and upper electrode is not connected to the detection circuit.

* * * * *